(12) United States Patent
Carroll, Jr.

(10) Patent No.: US 10,427,732 B1
(45) Date of Patent: Oct. 1, 2019

(54) ARTICULATED VEHICLE JACKKNIFE PREVENTION SYSTEM

(71) Applicant: James C. Carroll, Jr., Milton, DE (US)

(72) Inventor: James C. Carroll, Jr., Milton, DE (US)

( * ) Notice: Subject to any disclaimer, the term of this patent is extended or adjusted under 35 U.S.C. 154(b) by 0 days.

(21) Appl. No.: 16/189,354

(22) Filed: Nov. 13, 2018

Related U.S. Application Data

(60) Provisional application No. 62/730,567, filed on Sep. 13, 2018.

(51) Int. Cl.
| | |
|---|---|
| *B62D 53/08* | (2006.01) |
| *B60T 8/17* | (2006.01) |
| *B60T 8/24* | (2006.01) |
| *B60T 7/20* | (2006.01) |

(52) U.S. Cl.
CPC ........ *B62D 53/0871* (2013.01); *B60T 8/1708* (2013.01); *B60T 8/248* (2013.01); *B60T 7/20* (2013.01); *B60T 2230/06* (2013.01)

(58) Field of Classification Search
CPC ... B62D 53/0871; B60T 8/1708; B60T 8/248; B60T 7/20; B60T 2230/06
USPC ............................................. 701/36; 280/432
See application file for complete search history.

(56) References Cited

U.S. PATENT DOCUMENTS

| | | | | |
|---|---|---|---|---|
| 2006/0212193 | A1* | 9/2006 | Breed ................. | B60C 23/0425 701/33.7 |
| 2010/0256836 | A1* | 10/2010 | Mudalige ............... | G08G 1/163 701/2 |

* cited by examiner

*Primary Examiner* — Gertrude Arthur Jeanglaude
(74) *Attorney, Agent, or Firm* — Caesar Rivise, PC

(57) ABSTRACT

A transportation safety apparatus for a vehicle combination, the vehicle combination including a leading vehicle that pulls a trailing vehicle, the apparatus comprising: a plurality of force sensors for measuring pressure on opposite sides of the trailing vehicle; a wheel direction sensor for measuring aim angle at which tires on the leading vehicle aim said leading vehicle; at least one of: a) a plurality of position sensors for measuring angle difference between the leading vehicle and the trailing vehicle; and b) an angle sensor for measuring centerline angle between a leading centerline of the leading vehicle and a trailing centerline of the trailing vehicle; and a processing unit for signaling jack knife risk based on force measured by one of the force sensors, the wheel direction sensor, and at least one of the angle difference and the centerline angle.

19 Claims, 8 Drawing Sheets

ARTICULATED VEHICLE JACKKNIFE PREVENTION SYSTEM

FIELD OF THE INVENTION

This patent specification relates to the field of systems configured to ensure the safety of transportation vehicles. More specifically, this patent specification relates to a transportation safety system that is configured to prevent vehicle jackknifing of articulated vehicles.

BACKGROUND

A common and often deadly event for transportation drivers is "Jackknifing" of their articulated vehicles, such as a vehicle towing a trailer. Jackknifing refers to the folding of an articulated vehicle so that it is generally bent into a V-shape in an uncontrolled skidding movement. For example, if an articulated vehicle, such as a tractor and trailer skids, the trailer can push the towing vehicle from behind until it spins the towing vehicle around to face backwards. This may be caused by equipment failure, improper braking, or adverse road conditions such as wet or icy road surfaces. A jackknife event of a heavy vehicle can be fatal to the driver as the top of the cab can be crushed or sliced off as it swings round violently and tries to fold under the trailer. While jackknife prevention systems and devices exist, none have been found universally suitable to articulated vehicles and loss of life and property continue to result from a lack of adoption.

Therefore, a need exists for novel systems configured to ensure the safety of transportation vehicles. There is also a need for novel transportation safety systems that are configured to prevent vehicle jackknifing of articulated vehicles. A further need exists for novel transportation safety systems that are generally universally suitable to articulated vehicles. Finally, a need exists for novel transportation safety systems that are able to decrease or eliminate loss of life and property from articulate vehicle jackknifing.

BRIEF SUMMARY OF THE INVENTION

A transportation safety system for use with an articulated vehicle is provided. The system is configured to prevent vehicle jackknifing of articulated vehicles. In some embodiments, the system may include a first lateral force sensor and a second lateral force sensor which may be positioned on opposing sides of a trailing vehicle, such as a trailer. The lateral force sensors may measure the pressure exerted on the tires of the trailing vehicle. A wheel direction sensor may measure the angle of attack of the steering tires of the leading vehicle. A positional sensor may measure the position of the trailing vehicle relative to the leading vehicle. An angle sensor may measure the angle between the leading vehicle centerline and the trailing vehicle centerline. A temperature sensor may measure the ambient temperature of the environment around the articulated vehicle, and a precipitation sensor may determine if the road surface that the articulated vehicle is operating on is wet. The sensors may be in communication with a processing unit which may also be in communication with a traction controller. The processing unit may modulate the speed of one or more tires of the trailing vehicle via the traction controller to prevent jackknifing of the trailing vehicle depending on the measurements provided by the sensors.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Figure 1:
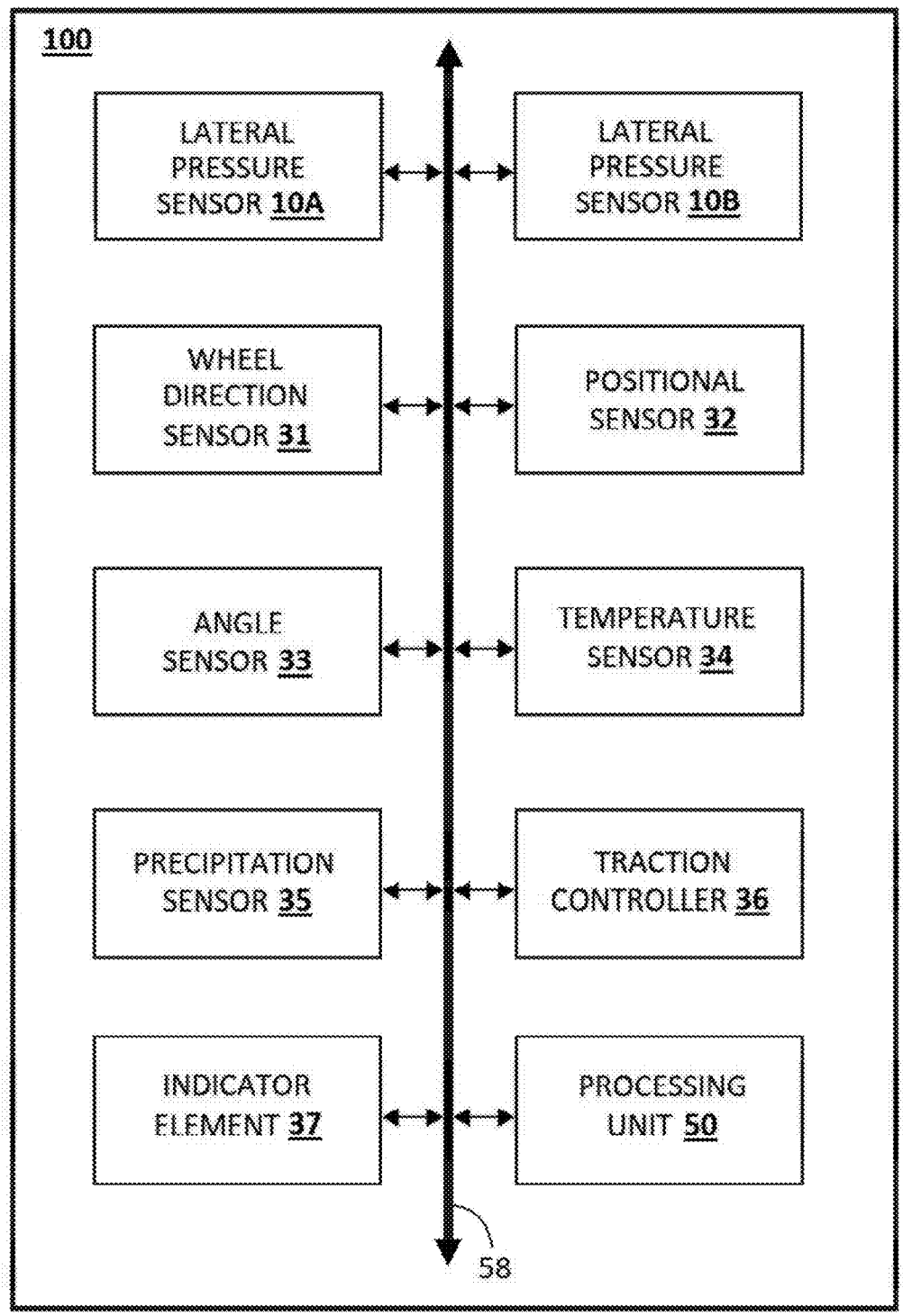
FIG. 1 depicts a block diagram of an example of a transportation safety system according to various embodiments described herein.

For purposes of description herein, the terms "upper", "lower", "left", "right", "rear", "front", "side", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts of the invention. Hence, specific dimensions and other physical characteristics relating to the embodiments disclosed herein are not to be considered as limiting, unless expressly stated otherwise.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 10% of the specified number. Additionally, as used in this application, the term "substantially" means that the actual value is within about 10% of the actual desired value, particularly within about 5% of the actual desired value and especially within about 1% of the actual desired value of any variable, element or limit set forth herein.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

A new transportation safety system that is configured to prevent vehicle jackknifing of articulated vehicles is discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

The present invention will now be described by example and through referencing the appended figures representing preferred and alternative embodiments. FIG. 1 illustrates an example of a transportation safety system ("the system") 100 for use with an articulated vehicle 200 according to various embodiments. In some embodiments, the system 100 may comprise a first lateral force sensor 10A and a second lateral force sensor 10B which may be positioned on opposing sides of a trailing vehicle 210, such as a trailer. The lateral force sensors 10A, 10B, may measure the pressure exerted on the tires 211 of the trailing vehicle 210. A wheel direction sensor 31 may measure the angle of attack of the steering tires 202 of the leading vehicle 201. A positional sensor 32 may measure the position of the trailing vehicle 210 relative to the leading vehicle 201. An angle sensor 33 may measure the angle between the leading vehicle 201 centerline and the trailing vehicle 210 centerline. A temperature sensor 34 may measure the ambient temperature of the environment around the articulated vehicle 200, and a precipitation sensor 35 may determine if the road surface that the articulated vehicle 200 is operating on is wet. The sensors 10A, 10B, 31, 32, 33, 34, 35, may be in communication with a processing unit 50 which may also be in communication with a traction controller 36. The processing unit 50 may modulate the speed of one or more tires 211 of the trailing vehicle 210 via the traction controller 36 to prevent jackknifing of the trailing vehicle 210 depending on the measurements provided by the sensors 10A, 10B, 31, 32, 33, 34, 35.

As perhaps best shown in FIGS. 1, 3, 4, 5, and 6, in some embodiments, the system 100 may comprise one or more lateral force sensors 10, such as a first lateral force sensor 10A and a second lateral force sensor 10B. Preferably, located in the rear of the trailing vehicle 210 in a protected position and behind the rear tires 211 position, a lateral force sensor 10 determines the lateral pressure or force exerted on the rear tires 211 of the trailing vehicle 210 during a turning maneuver. The lateral force sensors 10 may be in communication with the processing unit 50 so that the lateral force data may be communicated to the processing unit 50. In some embodiments, a first lateral force sensor 10A may be generally located proximate to the tires 211 on the right side of the trailing vehicle 210, and a second lateral force sensor 10B may be generally located proximate to the tires 211 on the left side of the trailing vehicle 210. In other embodiments, one more lateral force sensors 10 may be located anywhere else on an articulated vehicle 200.

In some embodiments, a lateral force sensor 10 may comprise a housing 11, optionally cylindrical in shape, having a cavity 12. A first pressure sensor 23 having a first gauge 13 may be coupled to a first end 15 of the housing 11, and a second pressure sensor 24 having a second gauge 14 may be coupled to a second end 16 of the housing 11. The housing 11 may be coupled to the trailing vehicle 210 so that the first end 15 is above the second end 16. A force object 17 may be disposed within the cavity 12, and the force object 17 may move towards the first end 15 during turning maneuvers of the trailing vehicle 210 in which the first end 15 is relatively positioned on the outside edge of the turning maneuver. Each pressure sensor 21, 22, may comprise a piston 18, 19, which may be operably coupled to its respective gauge 13, 14, via a working fluid 21, 22, such as oil. When the force object 17 contacts or impacts a piston 18, 19, the force of the contact or impact is transferred to the gauge 13, 14, by the working fluid 21, 22, to allow the gauge 13, 14, of the pressure sensor 23, 24, to measure how much force is generated during the turning maneuver calibrated to the angle and distance between the first end 15 and second end 16.

For example, in a turning motion of an articulated vehicle 200, a lateral force sensor 10 having a force object 17 configured as a small ball (one inch in diameter or any other size) enclosed in the cavity 12 of the housing 11 is free to move back and forth (between the first end 15 and second end 16) towards left to right side and right to left side of trailing vehicle 210 so as to establish speed of ball travel in housing 11 (in this example, the housing 11 may measure one foot long for purposes of demonstration). When the ball force object 17 impacts on a piston 18, 19, of a pressure sensor 23, 24, the force of impact is measured by the respective gauge 13, 14, of the respective pressure sensor 23, 24. This results in a determination of pressure exerted on the tires' 211 outside treads that may be communicated to the processing unit 50.

In further embodiments, a lateral force sensor 10 may comprise a force object 17, optionally configured as a ball or slug, that may be enclosed in a tubular housing 11 which is tightly calibrated to allow the force object 17 to move freely, but to increasingly build air pressure against the pressure sensors 23, 24, as it moves to the right and conversely to the left. The ends 15, 16, of the housing 11 may have a bumper or the like to absorb shock. In still further embodiments, a lateral force sensor 10 may comprise a laser, sonic sensor, or other device, that measures distance and travel time of force object 17. In yet further embodiments, a lateral force sensor 10 may use a liquid working fluid 21, 22, in the cavity 12 having a measured viscosity, which slows the force object 17 travelling through the cavity 12, preferably with a laser sensor and bumper. In still further embodiments, a lateral force sensor 10 may comprise a piston 18, 19, that may be configured to increase/decrease air or liquid pressure in a cavity 11 of the housing 11 that may be measured by the gauges 13, 14, of the pressure sensors 23, 24. It should be understood that a lateral force sensor 10 may be manufactured to different sizes, shapes, and tolerances to allow the lateral force sensor 10 to accommodate different sizes, shapes, and other configurations of any trailing vehicle 210.

In some embodiments, the system 100 may comprise a wheel direction sensor 31. Generally, a wheel direction sensor 31 may measure the turning direction or "angle of attack" of the steering tires 202 of the leading vehicle 201 and provide this data to the processing unit 50. In further embodiments, the turning radius of steering tires 202 of the leading vehicle 201 may be measured by a direction sensor 31 and assigned an "angle of attack". A wheel direction sensor 31 may comprise any device or method for measuring the angle of attack of the steering tires 202, such as by using a laser distance measuring device, an electro-mechanical measurement, such as a motion sensor or compass containing a gyroscope rotor (also gyrostatic compass), a global positioning system (GPS) or any other suitable device or method.

In some embodiments, the system 100 may comprise a positional sensor 32 may be used to determine the orientation of a trailing vehicle's 210 orientation on a given roadway. Generally, a positional sensor 32 may measure the position of the trailing vehicle 210 relative to the leading vehicle 201 and communicate this data to the processing unit 50. Preferably, a positional sensor 32 may be located at a rearward, and more preferably rearmost, position on the trailing vehicle 210. A positional sensor 32 may comprise any suitable device or method for measuring the position of the trailing vehicle 210 relative to the leading vehicle 201. In some embodiments, a positional sensor 32 may comprise a GPS sensor or device. A GPS positional sensor 32 may predict the potential turn stress (determined by the road radius) of all the wheels and establishes a turning angle of attack, using mapping and location. A GPS positional sensor 32 may provide the advantage of not only determining leading vehicle 201 orientation to both the road and the trailing vehicle 210 itself, but also can roughly predict the articulated vehicle's 200 direction as it navigates turns in the road. In some embodiments, a positional sensor 32 may comprise a gyroscopic compass, such as an air-driven gyroscopic compass or an electric gyroscopic compass (like those found in Avionics). A gyroscopic compass positional sensor 32 may establish an articulated vehicle's 200 turn stress on the tires 211 and related centrifugal force of tractor and trailer sway (Yaw).

In further embodiments, a positional sensor 32 may comprise two or more laser sensors that may be placed on both sides of the leading vehicle 201 and aimed at reflectors on both sides of the trailing vehicle 210 at intervals to measure longitudinal orientation (angle) between leading vehicle 201 and trailing vehicle 210 (relative to the trailing vehicle 210) by accounting for the length of the trailing vehicle 210. As a result, complications of measuring longitudinal orientation under a trailing vehicle 210 from leading vehicle 201 tractor are avoided due to obstructions such as spare tire hung under chassis, air brake lines, landing gear, road debris, etc.

In some embodiments, the system 100 may comprise an angle sensor 33. Generally, an angle sensor 33 may measure the angle between the leading vehicle 201 centerline and the trailing vehicle 210 centerline and communicate this data to the processing unit 50. An angle sensor 33 may comprise any suitable device or method, such as a laser, electro-mechanical armature, etc., for measuring the angle between the leading vehicle 201 centerline and the trailing vehicle 210 centerline.

In some embodiments, the system 100 may comprise a temperature sensor 34. A temperature sensor 34 may measure the ambient temperature of the environment around the articulated vehicle 200 and communicate this data to the processing unit 50. A temperature sensor 34 may comprise a thermocouple, a resistive temperature device (RTDs, thermistors), an infrared temperature sensor, a bimetallic device, a liquid expansion device, a molecular change-of-state device, a silicon diode, or any other type of temperature sensor configured to electrically communicate temperature information.

In some embodiments, the system 100 may comprise a precipitation sensor 35. A precipitation sensor 35 may determine if the road surface that the articulated vehicle 200 is operating on is wet or has otherwise received precipitation, such as snow, sleet, hail, etc. In further embodiments, a precipitation sensor 35 may determine if a slick, moist road, or cold weather condition like black ice, snow, chemical spills, road debris, tree leaves covering the road, or other interfering objects or conditions are present on the road surface that can cause tire slippage. In still further embodiments, the precipitation sensor 35 and processing unit 50 may function as an obstruction avoidance system that can activate the traction controller 36 to slow the articulated vehicle 200 before hitting an obstacle such as a fallen tree, for example. A precipitation sensor 35 may comprise a water or moisture sensor, a video camera, sonic sensor or any other device or method which may be suitable for detecting interfering objects or conditions are present on the road surface that can cause tire slippage. In preferred embodiments, a processing unit 50 may activate the windshield wipers of the articulated vehicle 200 during the first indication of precipitation as measured by the precipitation sensor 35.

In some embodiments, the system 100 may comprise a traction controller 36 that may be in communication with a processing unit 50. Generally, a traction controller 36 may be configured to modulate the speed of one or more tires 211 of the trailing vehicle 210 and/or leading vehicle 201. In some embodiments, a traction controller 36 may comprise a traction control system. In further embodiments, a traction controller 36 may comprise any device or method which may be suitable for slowing or braking one or more tires 211, 201, of an articulated vehicle 200.

In some embodiments, a traction controller 36 may decrease the rotation of one or more tires 211, 201, to provide skid-braking that causes more traction control. In further embodiments, a traction controller 36 may alternate braking one or more left side tires 211, 201, and/or right side tires 211, 201, to drag the trailing vehicle 210 back correctively to a centered position. In still further embodiments, a traction controller 36 may be configured as or to provide lane keeping technology for the articulated vehicle 200.

In some embodiments, the system 100 may comprise an indicator element 37 which may be configured to visually apprise a user of the status of one or more elements of the device system and/or of one or more conditions that the device system is in. For example, if all elements of the system 100 are working properly, a light emitting type of indicator element 37, such as a LED light, may be operated by the processing unit to emit green light. As another example, an indicator element 37 may be configured to visually apprise a user if the articulated vehicle is in and/or in danger of being in a jackknife scenario. To provide visual information to a user, embodiments of an indicator element 37 can be implemented with one or more light emitting elements or other display devices, e.g., a LED (light emitting diode) display or LCD (liquid crystal display) monitor, for displaying information. Optionally, an indicator element 37 and a control input may be combined together as a touch screen graphical user interface (GUI) or the like.

Figure 2:
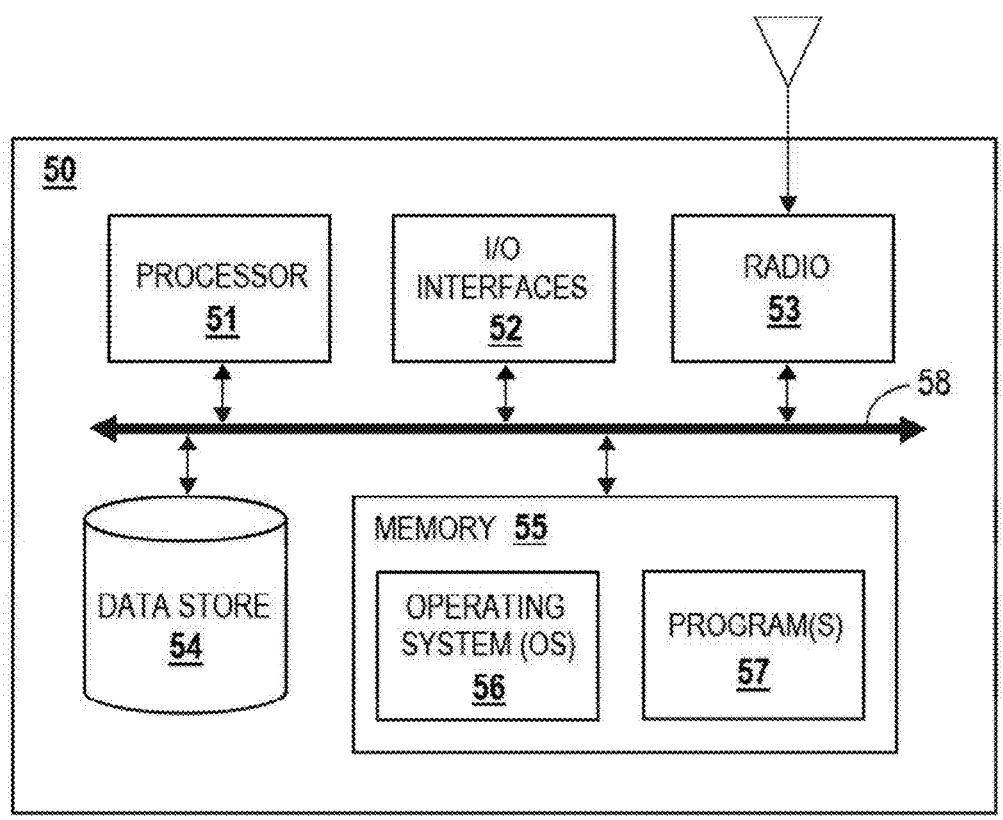
FIG. 2 illustrates a block diagram of an example of a processing unit of a transportation safety system according to various embodiments described herein.
Figure 3:
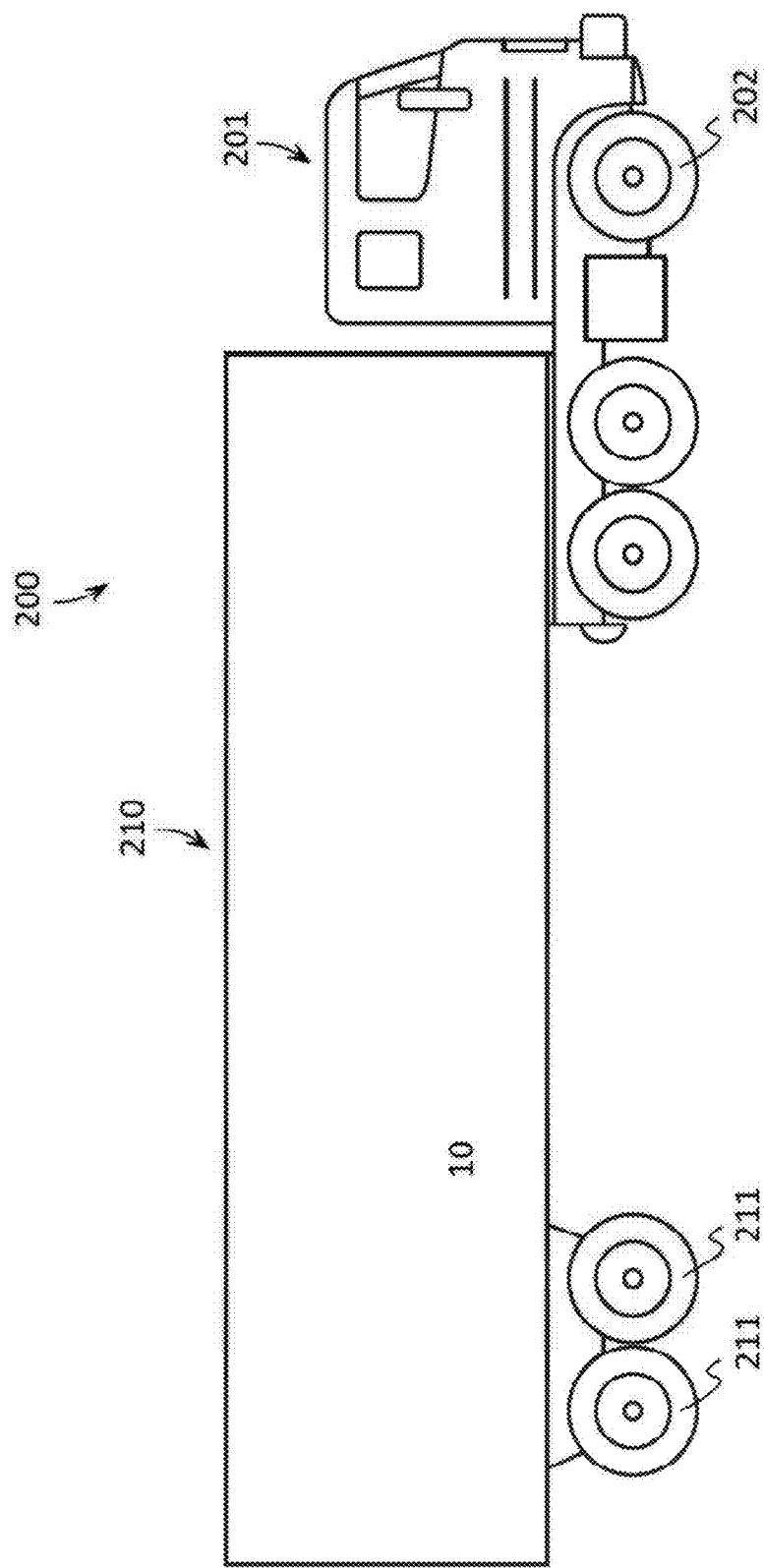
FIG. 3 shows a side elevation view of an example of an articulated vehicle according to various embodiments described herein.
Figure 4:
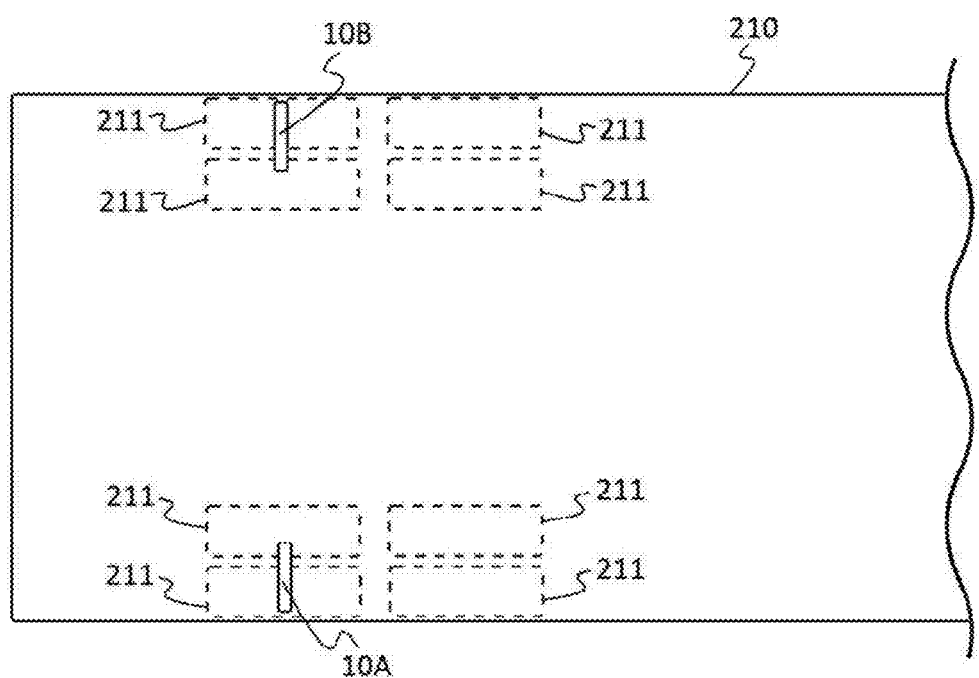
FIG. 4 depicts a top plan view of an example of a trailing vehicle of an articulated vehicle showing possible locations for lateral force sensor(s) according to various embodiments described herein.
Figure 5:
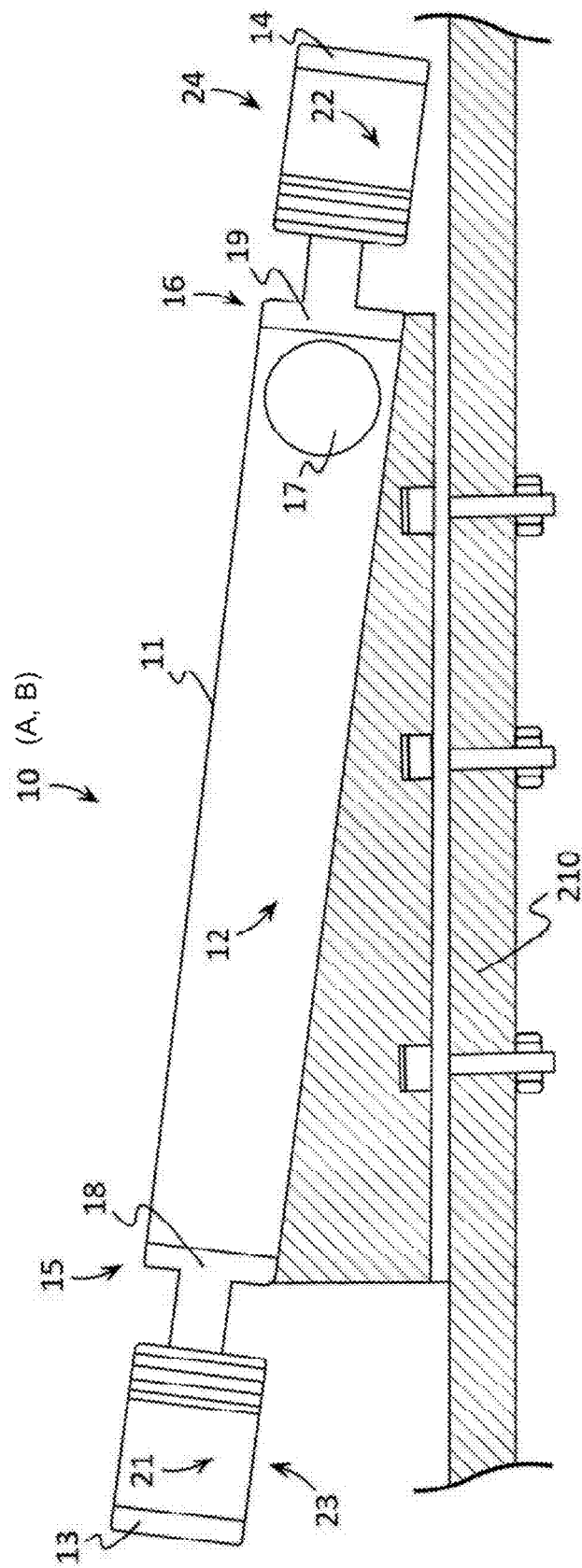
FIG. 5 illustrates a sectional elevation view of an example of a lateral force sensor according to various embodiments described herein.
Figure 6:
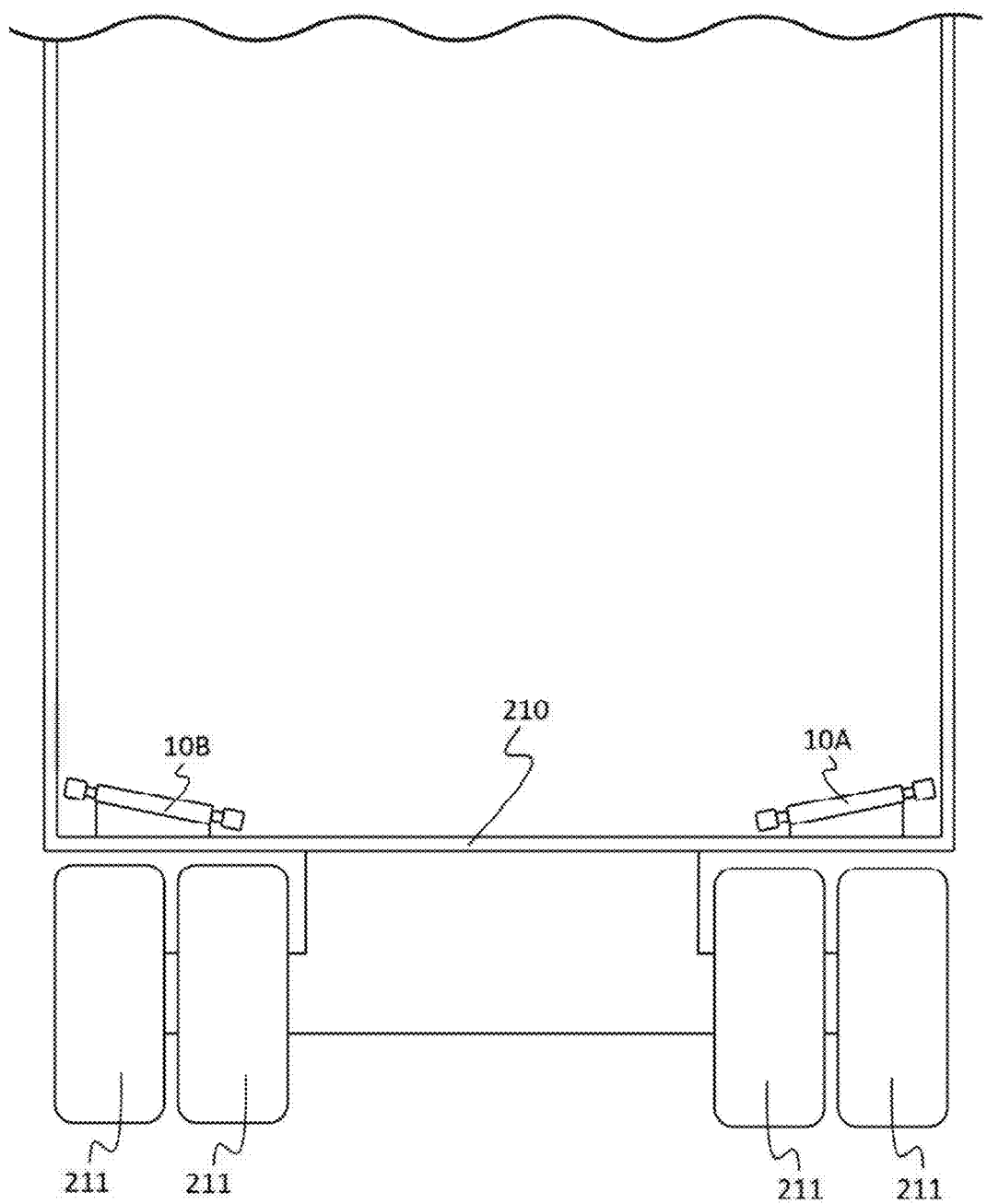
FIG. 6 shows a rear elevation view of an example of a trailing vehicle of an articulated vehicle showing possible locations for lateral force sensor(s) according to various embodiments described herein.

The sensors 10A, 10B, 31, 32, 33, 34, 35, indicator element(s) 37, and traction controller 36 may be in communication with a processing unit 50 which may, based on data provided by one or more sensors 10A, 10B, 31, 32, 33, 34, 35, modulate the speed of one or more tires 211 of the trailing vehicle 210 via the traction controller 36 to prevent jackknifing of the trailing vehicle 210. FIG. 3 shows a block diagram of an example of a processing unit 50 of a transportation safety system 100 according to various embodiments described herein. In some embodiments and in the present example, the processing unit 50 can be a digital device that, in terms of hardware architecture, generally comprises a processor 51, input/output (I/O) interfaces 52, an optional radio 53, a data store 54, and memory 55. It should be appreciated by those of ordinary skill in the art that FIG. 2 depicts the processing unit in an oversimplified manner, and a practical embodiment may include additional components or elements and suitably configured processing logic to support known or conventional operating features that are not described in detail herein.

The components of a processing unit 50 and elements (10A, 10B, 31, 32, 33, 34, 35, 36, 37) may be communicatively coupled via a local interface 58. The local interface 58 can be, for example but not limited to, one or more buses or other wired or wireless connections, integrated circuits, etc., as is known in the art. The local interface 58 can have additional elements, which are omitted for simplicity, such as controllers, buffers (caches), drivers, repeaters, and receivers, among many others, to enable communications. Further, the local interface 58 may include address, control, and/or data connections to enable appropriate communications among the aforementioned components.

The processor 51 is a hardware device for executing software instructions. The processor 51 can be any custom made or commercially available processor, a central processing unit (CPU), an auxiliary processor among several processors associated with the processing unit 50, a semiconductor-based microprocessor (in the form of a microchip or chip set), or generally any device for executing software instructions. When the processing unit 50 is in operation, the processor 51 is configured to execute software stored within the memory 55, to communicate data to and from the memory 55, and to generally control operations of the device 100 pursuant to the software instructions. In an exemplary embodiment, the processor 51 may include a mobile optimized processor such as optimized for power consumption and mobile applications.

The I/O interfaces 52 can be used to receive and record environmental information, may comprise one or more expansion ports for additional sensors, to receive user input from a control input and/or for providing system output through an indicator 37. The I/O interfaces 52 can also include, for example, a serial port, a parallel port, a small computer system interface (SCSI), an infrared (IR) interface, a radio frequency (RF) interface, a universal serial bus (USB) interface, and the like.

A radio 53 enables wireless communication to an external access device or network. In some embodiments, a radio 53 may operate via WiFi communication standards. In further embodiments, a radio 53 may operate on a cellular band and may communicate with or receive a Subscriber Identity Module (SIM) card or other wireless network identifier. Any number of suitable wireless data communication protocols, techniques, or methodologies can be supported by the radio 53, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Near-Field Communication (NFC); Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication.

The data store 54 may be used to store data. The data store 54 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 54 may incorporate electronic, magnetic, optical, and/or other types of storage media.

The memory 55 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 55 may incorporate electronic, magnetic, optical, and/or other types of storage media. Note that the memory 55 may have a distributed architecture, where various components are situated remotely from one another, but can be accessed by the processor 51. The software in memory 55 can include one or more software programs, each of which includes an ordered listing of executable instructions for implementing logical functions.

The processing unit 50 may also include a main memory, such as a random access memory (RAM) or other dynamic storage device (e.g., dynamic RAM (DRAM), static RAM (SRAM), and synchronous DRAM (SDRAM)), coupled to the bus for storing information and instructions to be executed by the processor 51. In addition, the main memory may be used for storing temporary variables or other intermediate information during the execution of instructions by the processor 51. The processing unit 50 may further include a read only memory (ROM) or other static storage device (e.g., programmable ROM (PROM), erasable PROM (EPROM), and electrically erasable PROM (EEPROM)) coupled to the bus for storing static information and instructions for the processor 51.

In the example of FIG. 2, the software in the memory system 55 includes a suitable operating system (O/S) 56 and programs 57. The operating system 56 essentially controls the execution of input/output interface 52 functions, and provides scheduling, input-output control, file and data management, memory management, and communication control and related services. The operating system 56 may be, for example, LINUX (or another UNIX variant), Android (available from Google), Symbian OS, Microsoft Windows CE, Microsoft Windows 7 Mobile, iOS (available from Apple, Inc.), webOS (available from Hewlett Packard), Blackberry OS (Available from Research in Motion), Raspbian (available from the Raspberry Pi Foundation) and the like. The programs 57 may include various applications, add-ons, etc. configured to provide end user functionality with the system 100. For example, exemplary programs 57 may include, but not limited to, environmental variable analytics and modulation of input/output interface 52 functions. In a typical example, the end user typically uses one or more of the programs 57 to control functions of the system 100 and to prevent an articulated vehicle 200 to which the system 100 is integrated with from jackknifing.

In some embodiments, separate leading vehicle 201, trailing vehicle 210, and cargo weights may be measured accurately at a weigh station or truck stop (optionally by an on-board sensor), so as to establish center point configurations to determine momentum potentials (or the product of Mass times Velocity), along with gross vehicle weight (GVW) of the articulated vehicle 200 and provided to the processing unit 50. Based on data received by the wheel direction sensor 31, the processing unit 50 may determine the angle of attack of the steering tires 202 of the leading vehicle 201. The processing unit 50 may compare the angle of attack of the steering tires 202 to the precise location of the positional sensor 32 located in a distant point in the trailing vehicle 210. This comparison provides an important benchmark since the combined masses are located in relation to each other for displacement comparison calculations of shifting mass with its inertia. A simultaneous measurement (occurring with the comparison of the angle of attack of the steering tires 202 to the precise location of the positional sensor 32) may be made by the angle sensor 33 to calculate the angle between the leading vehicle 201 centerline and the trailing vehicle 210 centerline. In a turn, the forward speed of the articulated vehicle 200, considering leading vehicle 201 and trailing vehicle 210 along with cargo weights, determines the pressure exerted on the outside and inside treads of the rear tires 211 of the trailing vehicle 210.

In a turning motion of the articulated vehicle 200 with/ without cargo, a lateral force sensor 10 preferably having a force object 17 enclosed in a cavity 12 of a housing 11 is free to move back and forth and towards left to right side and right to left side of trailing vehicle 210 so as to establish speed of force object 17 in housing. When the force object 17 impacts on the end point of the housing 11 it hits a pressure sensor 23, 24, (preferably one may be positioned at both ends of housing 11) with a force of impact, which is measured. This results in a determination of pressure exerted on the tires' 211 outside treads by the processing unit 50. Using this data, the processing unit 50 may predict a potential jackknife situation when coupled with artificial intelligence or software programming calculations of lateral pressure of the rear tires 211 in relation to the leading vehicle's 201 angle of attack (front tire 202 turning stress) and tracking with positional sensor 32 and angle sensor 33 data. When the processing unit 50 determines that the centrifugal force exerted on the rear tires 211 exceeds safety limits, the processing unit 50 automatically performs corrective action via the traction controller 36, such as slowing the speed of the articulated vehicle 200, simultaneously activating an indicator element 37 to sound an alarm and activated a warning light on the dash, and slowing the right and/or left tires 211 of the trailing vehicle 210.

The higher the articulated vehicle 200 speed, the more chances for a jackknife scenario to occur. If the rear tires 211 hold the road, the pressure on the lateral force sensor 10 is calculated by the processing unit 50 to be in the "Safe Zone". Conversely, if the articulated vehicle 200 speed exceeds a predetermined pressure or exertion, the processing unit 50 may activate an indicator element 37, such as warning light and sound, and may cause an automatic engine speed and/or tire 202, 211, speed reduction which is activated to result in the "SAFE ZONE" or travel speed. Automatic speed reduction may be performed by the processing unit 50 by the processing unit 50 activating a servo on the clutch, preferably overriding the driver reaction, which is slower and/or inexperienced.

Weather plays an important role in tire 202, 211, grip on the road. Generally, a slick, moist road or cold weather condition like black ice, snow, can result in additional "UNSAFE ZONE" readouts by the processing unit 50 based on the data received from a temperature sensor 34 and/or precipitation sensor 35. In some embodiments, extensive testing and examination of vehicle 200 interaction with road surfaces and vehicle 200 maneuverability in hazardous conditions for each type of vehicle 200 may be accomplished to establish the benchmark(s) that are optimized for each vehicle 200. In further embodiments, testing may include simulated computer models and as well as the "tried and true" real-world testing methods. Additionally, real-world testing and actual regular use of the system 100 on articulated vehicles 200 may be used to further refine the data models. Considerations for testing may include: driver interaction with and without a system 100; weather environs; road conditions, truck condition, make, year and model; engine displacement; tire 202, 211, inflation; various weight measurement and displacement; etc.

During jackknifing of an articulated vehicle 200, possible corrective measures can be executed by the processing unit 50 to straighten out the articulated vehicle's 200 tracking. In some embodiments, the processing unit 50 may operate a traction controller 36 to perform skid-braking that causes more traction control. In further embodiments, the processing unit 50 may operate a traction controller 36 to perform alternate braking left and right to drag the trailing vehicle 210 back correctively to a centered position. In still further embodiments, the processing unit 50 may operate a traction controller 36 to perform lane keeping functions.

In some embodiments, when the temperature falls below 32 degrees as measured by the temperature sensor 34, the processing unit 50 may activate the traction controller 36 to slow the articulated vehicle 200 in relation to the potential black ice conditions. In some embodiments, when the precipitation sensor 35, the processing unit 50 may activate the traction controller 36 to slow the articulated vehicle 200 proportionately to prevent skidding or side slipping into an uncontrolled situation, such as a jackknife scenario.

In some embodiments, the traction controller 36 may provide data to the processing unit 50 which may be used to determine drive wheel slippage and thus pre-brake the articulated vehicle 200 to slow it down before it has an accident. In further embodiments, if a weather forecaster or service determines that the articulated vehicle 200 is in or approaching bad weather the processing unit 50 may activate an indicator element 37 so that the driver can be warned to slow down. In still further embodiments, a company dispatcher should be able to monitor fleet weather conditions to remotely regulate the articulated vehicle's 200 speed via the processing unit 50 for the driver's safety to account for dangerous situations.

Figure 7:
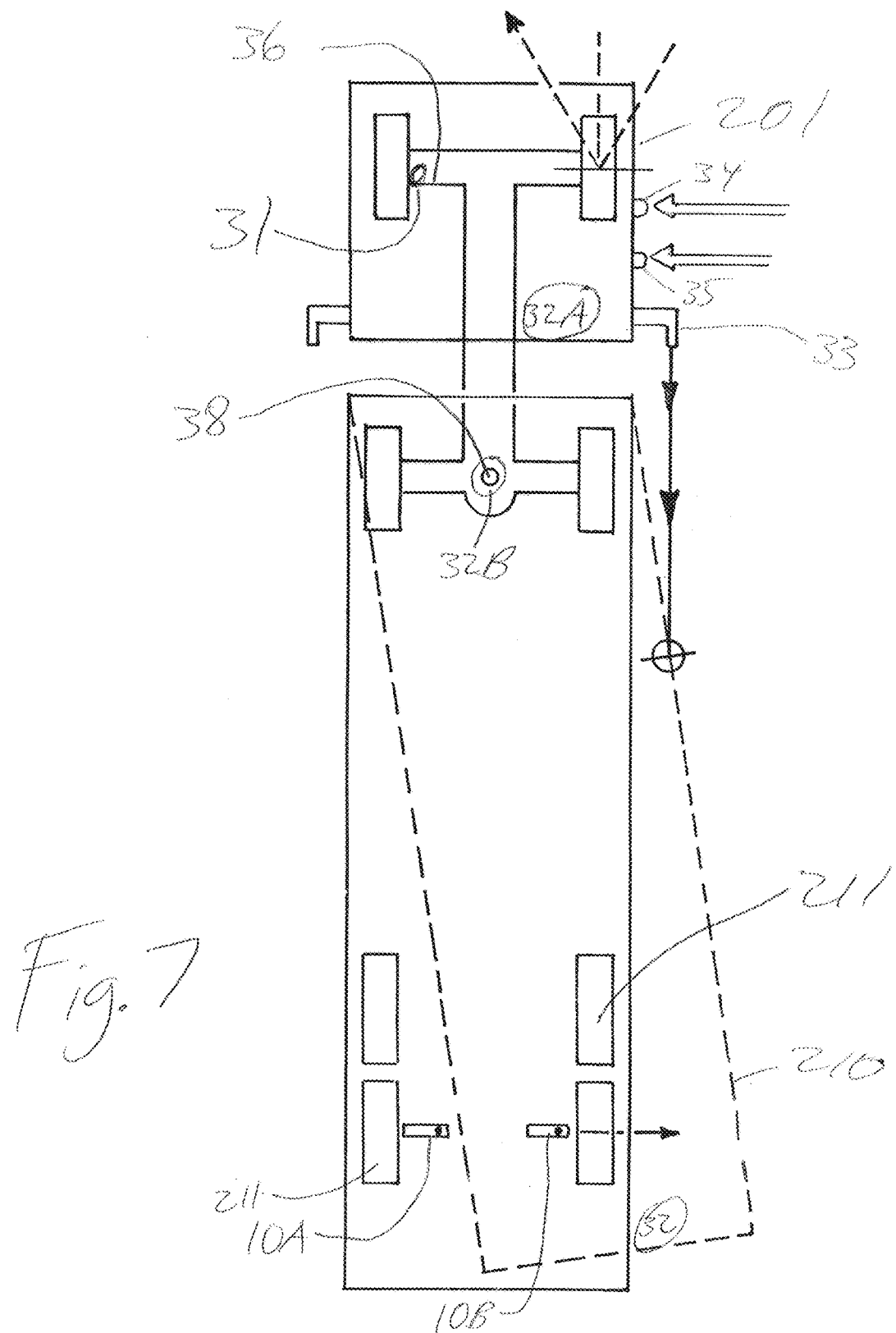
FIG. 7 is a top plan view that illustrates an exemplary embodiment of the present invention.

FIG. 7 is a top view of an exemplary vehicle that illustrates various features in accordance with one or more exemplary embodiments of the present invention. Optional positional sensor 32 is shown in an exemplary position relative to trailing vehicle 210. As previously described, in one embodiment, positional sensor 32 is a GPS unit that measures the orientation of trailing vehicle 210 relative to the road that it is on.

Comparison of a GPS position with map data may be accomplished in accordance with methods known to one of ordinary skill in the art. An example of how this may be performed is disclosed in U.S. Pat. No. 4,796,191, Honey et al. Vehicle Navigational System and Method which is hereby incorporated by reference in its entirety.

The GPS also measures position change rate of trailing vehicle 210 and compares it to force sensors 10A and 10B pressure sensors to provide data on jackknifing potential through analysis of the trailer's rate of sideways movement (momentum). This action happens instantly to evaluate vehicle movement before it becomes too violent and totally out of control. The reaction of the system is to slow engine speed by throttling down.

In another exemplary embodiment, optional positional sensor 32A is coupled to leading vehicle 201. In this exemplary embodiment, the orientation of both leading vehicle 201 and trailing vehicle 210 may be determined, and thus the angle between leading vehicle 201 and trailing vehicle 210 may be determined. In yet another embodiment, positional sensor 32B measures the amount of rotation of trailing vehicle 210 about ball mount 38. An exemplary positional sensor 32B is a rotary encoder.

Steering angle measurement sensor 31 is also illustrated for measuring the angle at which wheels 202 are turned. Sensor 31 may be coupled to the vehicle's steering rack 36 (for example). Exemplary steering angle measurement is described in U.S. Pat. No. 6,490,800 which is hereby incorporated by reference in its entirety. See also Techmor LA-1 laser system as a further example.

Optional temperature sensor 34 and precipitation sensor 35 may also be included. In addition, a crosswind sensor (not shown) may optionally be included as crosswinds can cause a trailer movement because the trailer acts like a sail. Crosswind measurement may optionally be used, without or without temperature and precipitation measurement in order to calculate jackknife risk.

Figure 8:
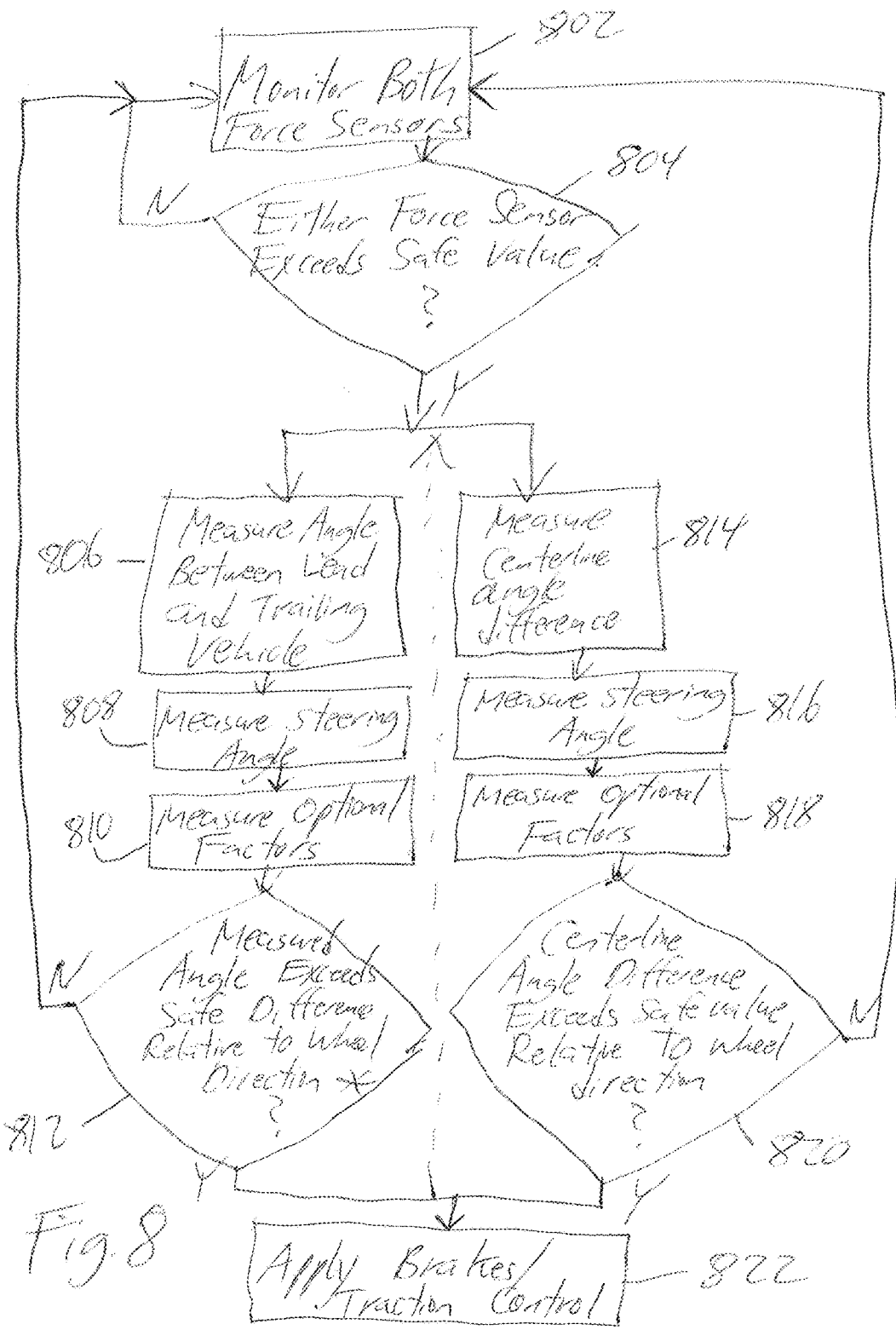
FIG. 8 is a flow chart diagram that illustrates an exemplary embodiment of the present invention.

Method steps in accordance with an exemplary embodiment of the present invention are illustrated in FIG. 8. FIG. 8 is a flow chart diagram.

At step 802, the force readings that are generated by both force sensors 10A and 10B are continuously monitored. At step 804, it is determined whether force sensor 10A or force sensor 10B is indicating force on tires 210 that exceed a safe value. A determination of what constitutes "safe value" may be empirically determined. A further determination of "safe value" may be obtained in accordance with the calculations provided in Masory O., Grainer Thomas, "A Simple Model for the Determination of Jackknifing", Proc. 17th Florida Conference on Recent Advances in Robotics, May 6-7, 2004, which is hereby incorporated by reference in its entirety. The safe value may be based only on the force measurement of force sensors 10A and 10B or it might be based on other factors as well, such as weight of trailing vehicle 210, combined weight of trailing vehicle 210 and leading vehicle 201, dimensions of trailing vehicle 210, whether the road surface is covered with rain and/or ice, etc.

If the force measured by either force sensor 804 does not exceed a safe value, then processing returns to step 802 for continued monitoring.

Processing may then proceed to step 806 or step 814

At step 806, the angle between leading vehicle 201 and trailing vehicle 210 is measured. As explained above, that angle may be determined in a variety of different ways, including a comparison of the measurement obtained by sensor 32 with the measurement obtained by sensor 32A, obtaining the measurement from sensor 32B, etc.

At step 808, a steering angle measurement is obtained. This value may be obtained, for example, from sensor 31.

At optional step 810, other measurements are obtained, including whether the road surface is wet and/or whether the temperature is below freezing (i.e. the road surface is covered with ice).

At step 812, a determination is made as to whether the angle of trailing vehicle 210 relative to leading vehicle 201, in combination with the measured steering angle measurement, is indicative that a jackknife is imminent. These values may be empirically obtained. Furthermore, these values may be dependent on other factors, such as vehicle weight(s), rain, ice, etc. (2.) Furthermore, the rate of speed of the tractor trailer may be helpful in determining a jackknife potential because it is compared to the angle of attack (wheel direction sensor) of the front tires which initiate the side pressure on the trailer's rear tires, measured by 10A and 10B.

In a further exemplary embodiment an arbitrary angle such as plus or minus five degrees (angle of trailing vehicle 210 relative to leading vehicle 201) is used as the basis of an imminent jackknife. If, for example, the relative angle is greater than plus or minus five degrees then at step 812 it is determined that a jackknife is imminent.

If at step 812 it is determined that a jackknife is imminent, then processing proceeds to step 822 to apply brakes/traction control. In an exemplary embodiment, traction control is supplied in accordance with U.S. Pat. No. 6,755,488 which is hereby incorporated by reference in its entirety.

In an alternative embodiment of the present invention, processing proceeds from step 804 to step 814. At step 814, the position of trailing vehicle 210 is determined using centerline angle measurement sensor 33. At step 816, a steering angle measurement is obtained, via sensor 31 (for example).

At optional step 818, optional parameters are obtained (e.g. rain, ice, crosswinds, etc.). The manner in which each of these factors may influence warning of a jackknife are as follows:

On a dry road, a heavy vehicle (i.e. fully loaded) has more "traction" than a lighter vehicle. A specific "dry road traction release point" is calculated by taking the vehicle weight and speed against the wheel position sensor readout. The sharper the turn is, the more chance of a traction release.

This causes a slick surface where traction release can occur for both heavy and light vehicles as the thin coating or layer of rain slightly "lifts" and therefore releases tire traction from road.

This causes tires to hydroplane causing loss of control. Release of traction in heavy rain is more inevitable here than in light rain, and presents a warning signal to slow vehicle to a tolerable speed (i.e. 55 MPH)

ICE, PACKED SNOW: Present the most dangerous condition for a tractor trailer, where at times the vehicle's momentum can carry it into a jackknife response. When the thermometer measures 32 degrees and it is raining, there is a good chance for a 'BLACK ICE" situation, where the driver is invited to ground the vehicle in a safe area. A very slow vehicle speed can still jackknife.

Each step may be performed processing unit 999 shown in FIG. 7. Processing unit 999 is for example a microprocessor that is known to one of ordinary skill in the art. The values from each sensor are transmitted to processing unit 999 so that risk of jackknife can be calculated.

At step 820, if it is determined that centerline angle difference exceeds a "safe value" then at step 822 brakes and/or traction control is applied.

In a further exemplary embodiment of the present invention, after performing step 812, processing proceeds to step 814 in order to provide a further level of analysis. Similarly, after performing step 820, processing can proceed to step 806 for a further level of analysis.

In yet another embodiment, GPS data in combination with the data acquisition described above is used to predict a jackknife condition. Thus, for example, the road ahead of the moving vehicle is evaluated (3.) This evaluation may be performed in accordance with the details set forth in U.S. Pat. No. 4,796,191 (full citation above) which is hereby incorporated by reference in its entirety. Furthermore, measuring the "straightness" or curvature of a road is known to one of ordinary skill in the art and may be accomplished for example by performing a least squares fit of the digital data that comprises the road ahead.

A straight road (in front of the vehicle) indicates low probability for a jackknife while a curved road (in front of the vehicle) indicates higher risk of jackknife than from a straight road. In one exemplary embodiment, the amount of curvature is measured to determine whether brakes and/or traction control should be applied in order to possibly prevent a jackknife. Thus, for example, measurement of a curb return radii greater than 30 feet may be indicative of elevated jackknife risk and detection thereof will result on automatic application of brakes and/or traction control (if brakes and/or traction control are not being already applied by the vehicle driver).

An example of an equation to determine whether a jackknife is imminent is as follows:

$$F+a(x)+b(y)+c(z)>J \text{ (} x \text{ and/or } y \text{ and/or } z \text{ may each be equal to 0)}$$

F=force measured by force sensors 10A or 10B
a=weight of trailer (optional)
b=angle between leading and trailing vehicle compared to steering angle (optional)
c=other factor (wind, rain, ice, etc)
x, y, z=multipliers to adjust effect of a,b,c on result (x,y, and z determined empirically, for example)
J=value above which jackknife is imminent In a further exemplary embodiment, the equation may be as follows:

$$F+a(x)(F)+b(y)(F)+c(z)(F)>J \text{ (}x \text{ and/or } y \text{ and/or } z \text{ may each be equal to 0)}$$

While some exemplary shapes and sizes have been provided for elements of the system 100, it should be understood to one of ordinary skill in the art that the lateral force sensors 10, 10A, 10B, and any other element described herein may be configured in a plurality of sizes and shapes including "T" shaped, "X" shaped, square shaped, rectangular shaped, cylinder shaped, cuboid shaped, hexagonal prism shaped, triangular prism shaped, or any other geometric or non-geometric shape, including combinations of shapes. It is not intended herein to mention all the possible alternatives, equivalent forms or ramifications of the invention. It is understood that the terms and proposed shapes used herein are merely descriptive, rather than limiting, and that various changes, such as to size and shape, may be made without departing from the spirit or scope of the invention.

Additionally, while some materials have been provided, in other embodiments, the elements that comprise the system 100 may be made from or may comprise durable materials such as aluminum, steel, other metals and metal alloys, wood, hard rubbers, hard plastics, fiber reinforced plastics, carbon fiber, fiber glass, resins, polymers or any other suitable materials including combinations of materials. Additionally, one or more elements may be made from or comprise durable and slightly flexible materials such as soft plastics, silicone, soft rubbers, or any other suitable materials including combinations of materials. In some embodiments, one or more of the elements that comprise the system 100 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the system 100 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, a slide-to-lock type connection method or any other suitable temporary connection method as one reasonably skilled in the art could envision to serve the same function. In further embodiments, one or more of the elements that comprise the system 100 may be coupled by being one of connected to and integrally formed with another element of the system 100.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A transportation safety apparatus for a vehicle combination,
the vehicle combination including a leading vehicle that pulls a trailing vehicle, said apparatus comprising:
a plurality of force sensors for measuring force on opposite sides of said trailing vehicle;
a wheel direction sensor for measuring aim-angle at which tires on said leading vehicle, that steer said leading vehicle, are turned;
at least one of: a) a plurality of position sensors for measuring angle difference between the leading vehicle and the trailing vehicle; and b) an angle sensor for measuring centerline angle between a leading centerline of the leading vehicle and a trailing centerline of the trailing vehicle; and
a processing unit for signaling jack knife risk based on said force measured by one of said force sensors, said wheel direction sensor, and at least one of said angle difference and said centerline angle.

2. A transportation safety apparatus according to claim 1, further comprising a traction controller for increasing traction of one of said tires responsive to said processing unit signaling jack knife risk.

3. A transportation safety apparatus according to claim 1, further comprising a GPS unit for detecting a curve in front of said leading vehicle, wherein said processing unit further signals jack knife risk based on detection of said curve.

4. A transportation safety apparatus according to claim 1, wherein said processing unit further signals jack knife risk based on at least one of weight of said leading vehicle and weight of said trailing vehicle.

5. A transportation safety apparatus according to claim 1, further comprising a water detector for detecting water, wherein said processing unit further signals jack knife risk based on said water detector detecting water.

6. A transportation safety apparatus according to claim 1, further comprising a temperature detector for detecting temperature, wherein said processing unit further signals jack knife risk based on said temperature detected by said temperature detector.

7. A transportation safety apparatus according to claim 2, wherein said increasing traction is performed by one of changing amount of power transmitted to one of said tires and applying braking to one of said tires.

8. A transportation safety apparatus according to claim 1, wherein each of the plurality of force sensors is on a respectively different side of said trailing vehicle and respectively comprises a housing, a force object that moves back in forth within said housing, and opposing pressure sensors that indicate amount of pressure exerted thereon by said force object, wherein each of the force sensors signals pressure on a respective one of the tires responsive to detection of pressure by said pressure sensors.

9. A transportation safety apparatus according to claim 1, wherein said force sensors are for measuring pressure on tires located on opposite sides of said trailing vehicle.

10. A transportation safety apparatus according to claim 1, wherein said processing unit signals jack knife risk based on said angle difference.

11. A transportation safety apparatus according to claim 1, wherein said processing unit signals jack knife risk based on said centerline angle.

12. A method for signaling risk of jack knife, said method comprising the steps of:
  measuring, with force sensors, force on opposite sides of a trailing vehicle, that is trailing a leading vehicle;
  measuring aim angle at which tires on said leading vehicle, that steer said leading vehicle, are turned;
  measuring at least one of: a) angle difference between the leading vehicle and the trailing vehicle based on output from a plurality of position sensors; and b) centerline angle between a leading centerline of the leading vehicle and a trailing centerline of the trailing vehicle; and
  signaling jack knife risk based on force measured by one of said force sensors, said wheel direction sensor, and at least one of said angle difference and said centerline angle.

13. A method for signaling risk of jack knife according to claim 12, said method further comprising the step of increasing traction of one of said tires responsive to said signaling jack knife risk from a processing unit.

14. A method for signaling risk of jack knife according to claim 12, said method further comprising the step of detecting a curve in front of said leading vehicle, wherein said jack knife risk is signaled based on detection of said curve.

15. A method for signaling risk of jack knife according to claim 12, said method further comprising the step of signaling jack knife risk based on at least one of weight of said leading vehicle and weight of said trailing vehicle.

16. A method for signaling risk of jack knife according to claim 12, said method further comprising the step of detecting water, wherein signaling of jack knife risk is also based on a water detector detecting water on a road surface on which said lead vehicle is driving.

17. A method for signaling risk of jack knife according to claim 12, said method further comprising the step of detecting temperature by a temperature detector, wherein said signaling of jack knife risk is also based on said temperature detected.

18. A method for signaling risk of jack knife according to claim 13, wherein said increasing traction is performed by one of changing amount of power transmitted to one of said tires and applying braking to one of said tires.

19. A method of signaling risk of jack knife according to claim 12, said method further comprising the step of measuring pressure on tires located on opposite sides of said trailing vehicle.

* * * * *